United States Patent
Vermeersch et al.

(10) Patent No.: US 10,422,425 B2
(45) Date of Patent: Sep. 24, 2019

(54) MODULAR SHIFT ASSEMBLY

(71) Applicant: STEERING SOLUTIONS IP HOLDING CORPORATION, Saginaw, MI (US)

(72) Inventors: Michael C. Vermeersch, Essexville, MI (US); Arthur W. Nellett, Davison, MI (US); Robert W. Dubay, Saginaw, MI (US); Robert D. Bueche, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 273 days.

(21) Appl. No.: 15/487,676

(22) Filed: Apr. 14, 2017

(65) Prior Publication Data

US 2018/0299007 A1 Oct. 18, 2018

(51) Int. Cl.
| | |
|---|---|
| *F16H 59/10* | (2006.01) |
| *F16H 61/24* | (2006.01) |
| *F16H 61/36* | (2006.01) |
| *B60K 20/06* | (2006.01) |
| *F16H 59/02* | (2006.01) |

(52) U.S. Cl.
CPC .......... *F16H 59/10* (2013.01); *B60K 20/06* (2013.01); *F16H 59/0204* (2013.01); *F16H 59/0278* (2013.01); *F16H 61/24* (2013.01); *F16H 61/36* (2013.01); *F16H 2059/026* (2013.01); *F16H 2061/242* (2013.01); *F16H 2061/247* (2013.01)

(58) Field of Classification Search
CPC .. F16H 59/10; F16H 59/0278; F16H 59/0204; F16H 61/24; F16H 61/36; F16H 2061/247; F16H 2061/242; F16H 2059/026; B60K 20/06; Y10T 74/20146; Y10T 74/20152; Y10T 74/20049; Y10T 74/2011

USPC ............. 280/771; 74/473.31, 473.15, 473.25
See application file for complete search history.

(56) References Cited

U.S. PATENT DOCUMENTS

| | | | | |
|---|---|---|---|---|
| 4,821,605 | A * | 4/1989 | Dzioba | B60R 25/02144 192/219.4 |
| 4,934,208 | A * | 6/1990 | Carlstrom | B60K 20/06 116/28.1 |
| 6,327,928 | B1 * | 12/2001 | Bowerman | B60K 20/06 74/473.15 |
| 8,783,718 | B1 * | 7/2014 | Clark | B60K 20/06 280/775 |
| 2003/0205100 | A1 * | 11/2003 | Vermeersch | B60R 25/02144 74/473.32 |
| 2005/0067825 | A1 * | 3/2005 | Manwaring | B60Q 1/1469 280/777 |
| 2014/0260749 | A1 * | 9/2014 | Vermeersch | F16H 61/24 74/473.3 |

* cited by examiner

*Primary Examiner* — Keith J Frisby (57) ABSTRACT

A steering column assembly includes a jacket assembly and a modular shift assembly that is operatively connected to the jacket assembly. The modular shift assembly includes a shift bracket, a shaft, and a shift clevis. The shift bracket has a first shift bracket portion that defines a shift bracket first opening and a second shift bracket portion. The second shift bracket portion defines a shift bracket second opening. The shaft has a first shaft portion and a second shaft portion. The second shaft portion is at least partially received within the shift bracket opening. The shift clevis extends at least partially through the first shaft opening.

20 Claims, 8 Drawing Sheets

MODULAR SHIFT ASSEMBLY

BACKGROUND

Vehicles are provided with a shift system that is operable to select or shift gears of a vehicle transmission. The shift system may be mounted to a vehicle steering column and is operatively connected to the vehicle transmission through a control mechanism. Vehicle packaging constraints may lead to interference with the shift system. Furthermore, packaging of the shift system may present difficulties in servicing the shift system.

SUMMARY

According to an embodiment of the present disclosure, a steering column assembly is provided. The steering column assembly includes a jacket assembly that extends along a first axis and a modular shift assembly that is operatively connected to the jacket assembly. The modular shift assembly includes a shift bracket, a shaft, and a shift clevis. The shift bracket has a first shift bracket portion that defines a shift bracket first opening that extends along a second axis and a second shift bracket portion extending from the first shift bracket portion. The second shift bracket portion defines a shift bracket second opening that extends along a third axis. The shaft has a first shaft portion that defines a first shaft opening that extends along the second axis and a second shaft portion that extends from the first shaft portion. The second shaft portion is at least partially received within the shift bracket second opening. The shift clevis extends at least partially through the first shaft opening and the shift bracket first opening towards the jacket assembly.

According to another embodiment of the present disclosure, a steering column assembly is provided. The steering column assembly includes a jacket assembly that extends along a first axis and a modular shift assembly. The modular shift assembly includes a mounting bracket, a cable bracket, a shift bracket, and a shift gate assembly. The mounting bracket is disposed on the jacket assembly. The cable bracket has a first cable bracket portion that is operatively connected to the mounting bracket and a second cable bracket portion that extends from the first cable bracket portion. The shift bracket has a first shift bracket portion that is operatively connected to the first cable bracket portion and a second shift bracket portion that extends from the first shift bracket portion. The shift gate assembly is at least partially disposed between and operatively connected to the first cable bracket portion and the first shift bracket portion.

According to yet another embodiment of the present disclosure, a modular shift assembly for a steering column assembly is provided. The modular shift assembly includes a cable bracket, a shift bracket, a shaft, and a shift gate assembly. The cable bracket is operatively connected to a jacket assembly. The shift bracket has a first shift bracket portion operatively connected to the cable bracket and defines a shift bracket first opening and a second shift bracket portion defining a shift bracket second opening. The shaft has a first shaft portion that defines a first shaft opening and a second shaft portion that is at least partially received within the shift bracket second opening. The shift gate assembly is disposed between the shift bracket and the cable bracket. The shift gate assembly includes a detent plate that is operatively connected to the first shift bracket portion and a tab that extends from the detent plate and is operatively connected to the first shift bracket portion and the cable bracket.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
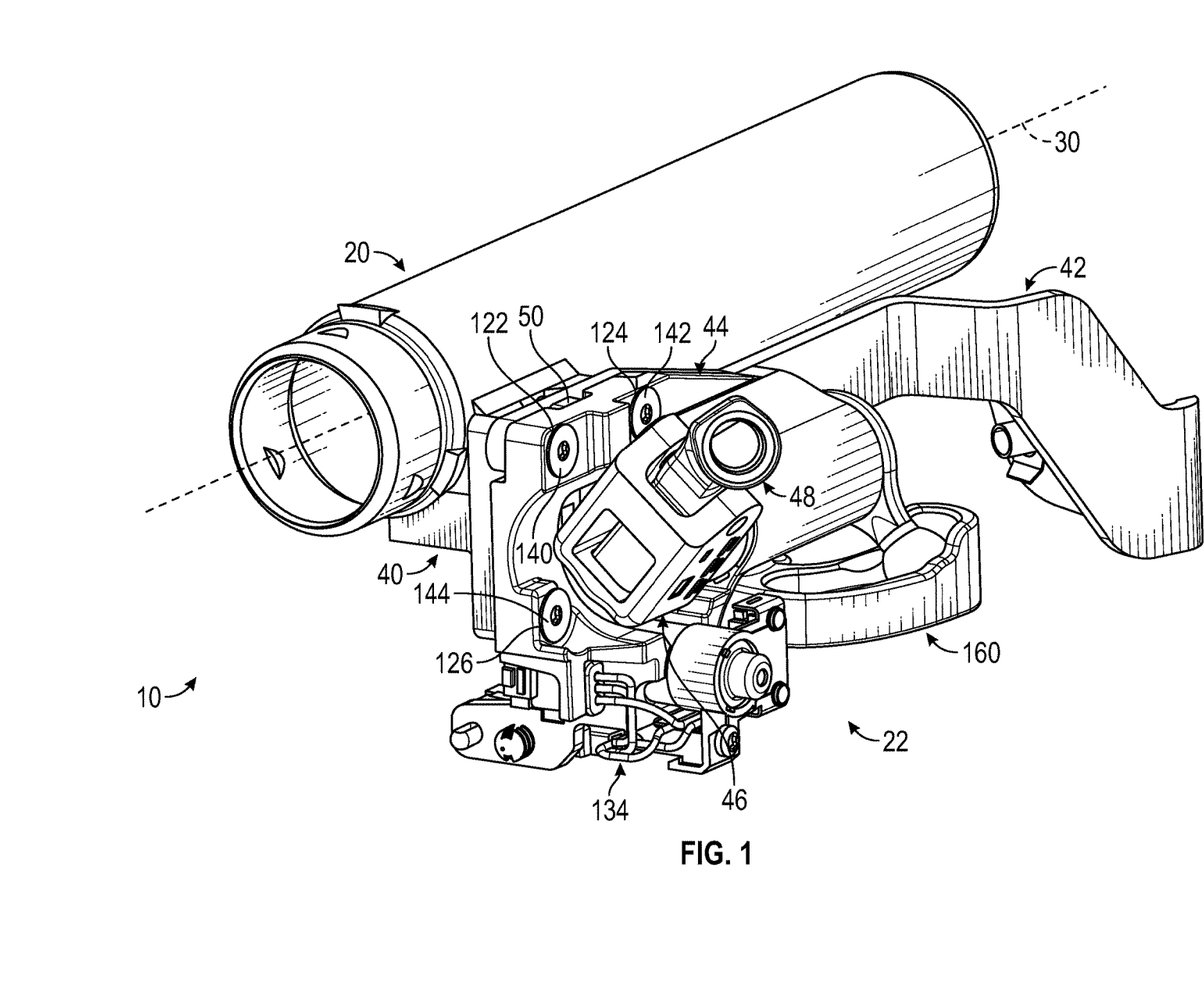
FIG. 1 a perspective view of a steering column assembly.

Referring to FIG. 1, a steering column assembly 10 is illustrated. The steering column assembly 10 is an adjustable steering column assembly that may be telescopically adjustable along a longitudinal axis and may be tiltable about an axis that is disposed transverse to the longitudinal axis. The steering column assembly 10 includes a jacket assembly 20 and a modular shift assembly 22.

The jacket assembly 20 extends along a first axis 30. The first axis 30 may be a longitudinal axis along which the jacket assembly 20 may telescope. The jacket assembly 20 is collapsible along the first axis 30 to absorb energy during an impact event. The jacket assembly 20 may also be tiltable or rake adjustable about the axis that is disposed transverse to the first axis 30.

The jacket assembly 20 may be disposed within a shroud assembly. The jacket assembly 20 is positioned within the shroud assembly and is spaced apart from and does not engage the shroud assembly even during a telescope operation, a tilt operation, or a collapse operation.

The modular shift assembly 22 is operatively connected to the jacket assembly 20. The modular shift assembly 22 is a low-profile shift assembly that is spaced apart from and does not engage the shroud assembly even during a telescope operation, a tilt operation, or collapse operation.

Referring to FIGS. 1-5, the modular shift assembly 22 includes a mounting bracket 40, a cable bracket 42, a shift bracket 44, a shaft 46, a shift clevis 48, and a shift gate assembly 50.

The mounting bracket 40 is disposed on the jacket assembly 20. The mounting bracket 40 may be joined to the jacket assembly 20 by a variety of methods including fastening, welding, or the like.

Figure 2:
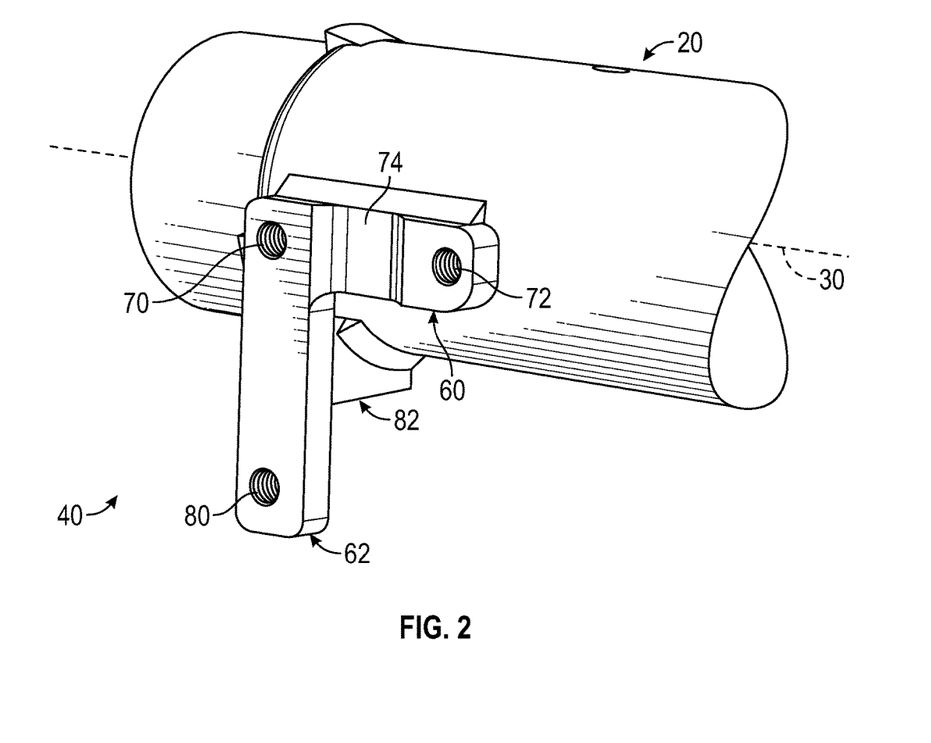
FIG. 2 is a partial perspective view of a portion of the steering column assembly.

Referring to FIGS. 1 and 2, the mounting bracket 40 is operatively connected to the cable bracket 42 and the shift bracket 44. The mounting bracket 40 includes a first mounting bracket portion 60 and a second mounting bracket portion 62. The first mounting bracket portion 60 is disposed substantially parallel to the first axis 30. The first mounting bracket portion 60 defines a first mounting hole 70, a second mounting hole 72, and a recess 74. The first mounting hole 70 and a second mounting hole 72 extend along an axis that is disposed substantially transverse to the first axis 30. The recess 74 is disposed between the first mounting hole 70 and the second mounting hole 72. The recess 74 extends towards the first axis 30.

The second mounting bracket portion 62 extends from the first mounting bracket portion 60. The second mounting bracket portion 62 is disposed substantially transverse to the first axis 30. The second mounting bracket portion 62 defines a third mounting hole 80 and includes a weldment 82. Third mounting hole 80 extends along an axis that is disposed substantially transverse to the first axis 30. The second mounting bracket portion 62 defines a substantially flat mounting plane that extends between the first mounting hole 70 and the third mounting hole 80. The weldment 82 extends towards the first axis 30. The weldment 82 is disposed between the first mounting hole 70 and the third mounting hole 80. The weldment 82 is arranged to engage the jacket assembly 20 and is joined to the jacket assembly 20.

Referring to FIGS. 1 and 3-5, the cable bracket 42 is operatively connected to and is disposed between the mounting bracket 40 and the shift bracket 44. The cable bracket 42 includes a first cable bracket portion 90 and a second cable bracket portion 92.

The first cable bracket portion 90 is disposed substantially parallel to the first axis 30. The first cable bracket portion 90 is operatively connected to the first mounting bracket portion 60 of the mounting bracket 40. The first cable bracket portion 90 defines a first bracket mounting hole 94 and the second bracket mounting hole 96. The first bracket mounting hole 94 is proximately aligned with the first mounting hole 70 of the mounting bracket 40. The second bracket mounting hole 96 is proximally aligned with the second mounting hole 72 of the mounting bracket 40.

The second cable bracket portion 92 extends from the first cable bracket portion 90. In at least one embodiment, a transition region 98 extends between the first cable bracket portion 90 and the second cable bracket portion 92, such that the second cable bracket portion 92 extends from the transition region 98. The transition region 98 is tapered or angled from the first cable bracket portion 90 towards the second cable bracket portion 92. The cable bracket 42 is secured to the shift bracket 44 by a pair of fasteners 102 that extends through the transition region 98 of the cable bracket 42.

The second cable bracket portion 92 is disposed substantially parallel to but not coplanar with the first cable bracket portion 90 such that the first cable bracket portion 90 is disposed closer to the first axis 30 that the second cable bracket portion 92. The second cable bracket portion 92 includes a receiving portion 100 that is arranged to receive at least a portion of a cable or a control mechanism that extends towards a transmission.

Referring to FIGS. 1 and 3-5, the shift bracket 44 is operatively connected to the cable bracket 42 and the mounting bracket 40. The shift bracket 44 includes a first shift bracket portion 110 and a second shift bracket portion 112.

The first shift bracket portion 110 defines a shift bracket first opening 120, a first shift bracket mounting hole 122, a second shift bracket mounting hole 124, a third shift bracket mounting hole 126, a first mounting opening 128, and a second mounting opening 130.

The shift bracket first opening 120 extends along a second axis 132. The second axis 132 is disposed substantially transverse to the first axis 30. The first shift bracket mounting hole 122 is proximately aligned with the first bracket mounting hole 94 and the first mounting hole 70. The second shift bracket mounting hole 124 is proximately aligned with the second bracket mounting hole 96 and the second mounting hole 72. The third shift bracket mounting hole 126 is proximately aligned with the third mounting hole 80.

The first mounting opening 128 extends along an axis that is disposed substantially parallel to the second axis 132 and is disposed substantially transverse to the first axis 30. The second mounting opening 130 is spaced apart from the first mounting opening 128. The second mounting opening 130 extends along another axis that is disposed substantially parallel to the first axis 30 and is disposed substantially transverse to the second axis 132.

The first mounting opening 128 and the second mounting opening 130 are arranged to receive at least a portion of a brake transmission shift interlock device (BTSI) 134. The BTSI 134 includes a BTSI centerline that is disposed below the first axis 30, the second axis 132, and the third axis 152.

The BTSI 134 includes a pin 136 and a switch 138. The pin 136 extends through the first mounting opening 128. The pin 136 is movable along the axis that is disposed substantially transverse to the first axis 30 between a retracted position and an extended position. The retracted position of the pin 136 permits the shift clevis 48 to move out of a park position. The extended position of the pin 136 inhibits the shift clevis 48 from moving out of the park position. The pin 136 moves between the extended position and the retracted position in response to activation of a braking system, such as depressing a brake pedal.

The switch 138 extends through the second mounting opening 130. The switch 138 extends along the another axis that is disposed substantially parallel to the first axis 30. The shift clevis 48 is arranged to selectively engage the switch 138 and the switch 138 of the BTSI 134 provides a signal indicative of the shift clevis 48 being in the park position.

The shift bracket 44 and the cable bracket 42 are secured to the mounting bracket 40 by a first fastener 140, a second fastener 142, and a third fastener 144. The first fastener 140 extends through the first shift bracket mounting hole 122, the first bracket mounting hole 94, and the first mounting hole 70. The second fastener 142 extends through the second shift bracket mounting hole 124, the second bracket mounting hole 96, and the second mounting hole 72. The first fastener 140 and the second fastener 142 operatively connects the first shift bracket portion 110 to the first cable bracket portion 90 and the first mounting bracket portion 60. The third fastener 144 extends through the third shift bracket mounting hole 126 and the third mounting hole 80. The third fastener 144 operatively connects the first shift bracket portion 110 to the second mounting bracket portion 62.

The second shift bracket portion 112 extends from the first shift bracket portion 110. The second shift bracket portion 112 defines a shift bracket second opening 150 that extends along a third axis 152. The third axis 152 is disposed substantially parallel to the first axis 30 and is disposed substantially transverse to the second axis 132.

The second shift bracket portion 112 defines a pivot member 154. The pivot member 154 extends along an axis that is disposed substantially transverse to the third axis 152 and the first axis 30. A cam assembly 160 is pivotally connected to the pivot member 154 of the second shift bracket portion 112 of the shift bracket 44. The cam assembly 160 is arranged to pivot in response to the shift clevis 48 being moved between positions indicative of a state or position of the transmission of a vehicle. For example, as the shift clevis 48 is moved between a park position and a reverse position, the cam assembly 160 is pivoted about the pivot member 154 to move a portion of a cable or a control mechanism that extends towards the transmission and is operatively connected to a portion of the cable bracket 42.

The shaft 46 is at least partially received within the second shift bracket portion 112. The shaft 46 includes a first shaft portion 170 and a second shaft portion 172.

Figure 3:
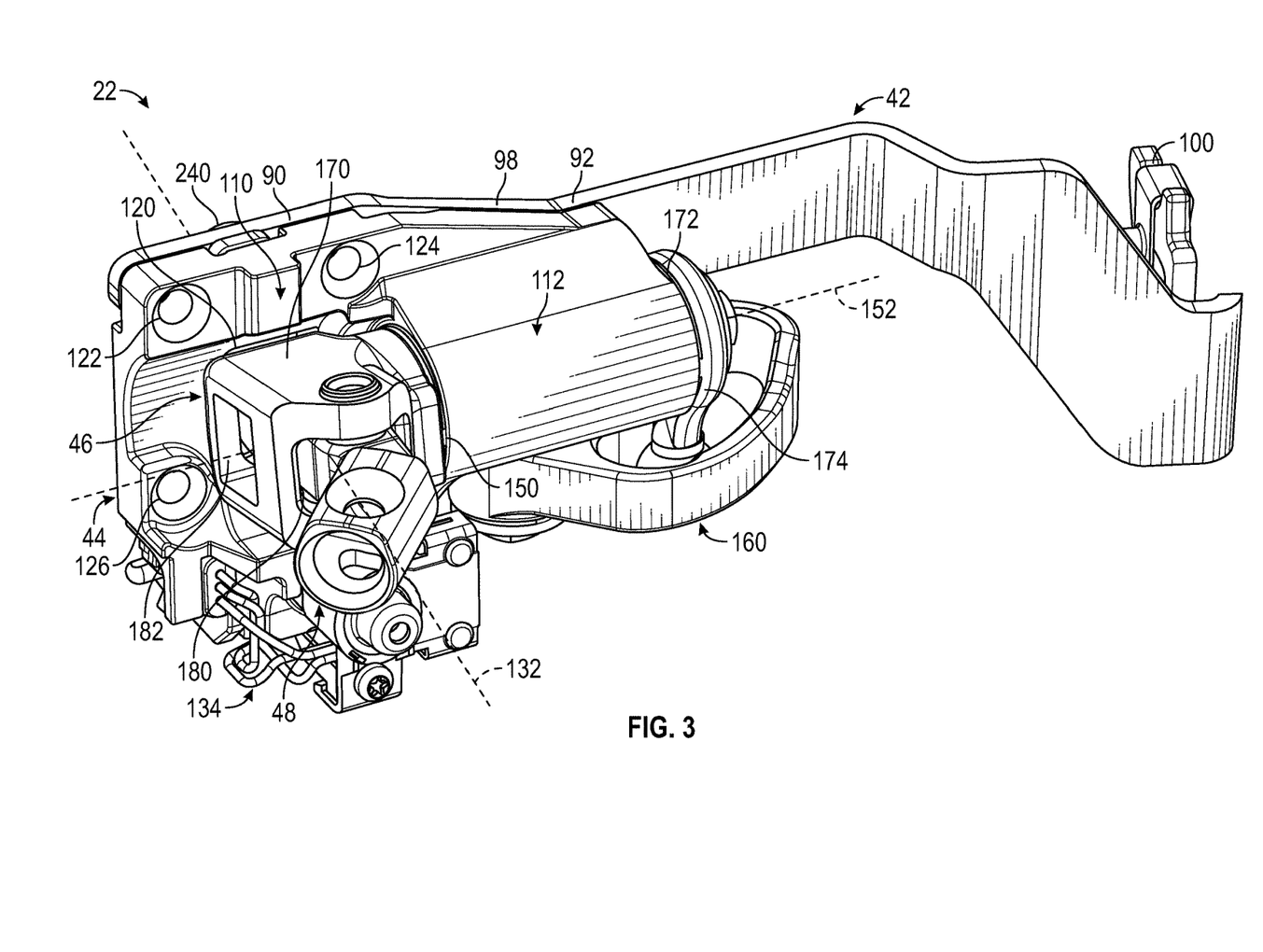
FIGS. 3 and 4 are perspective views of a modular shift assembly of the steering column assembly.
Figure 5:
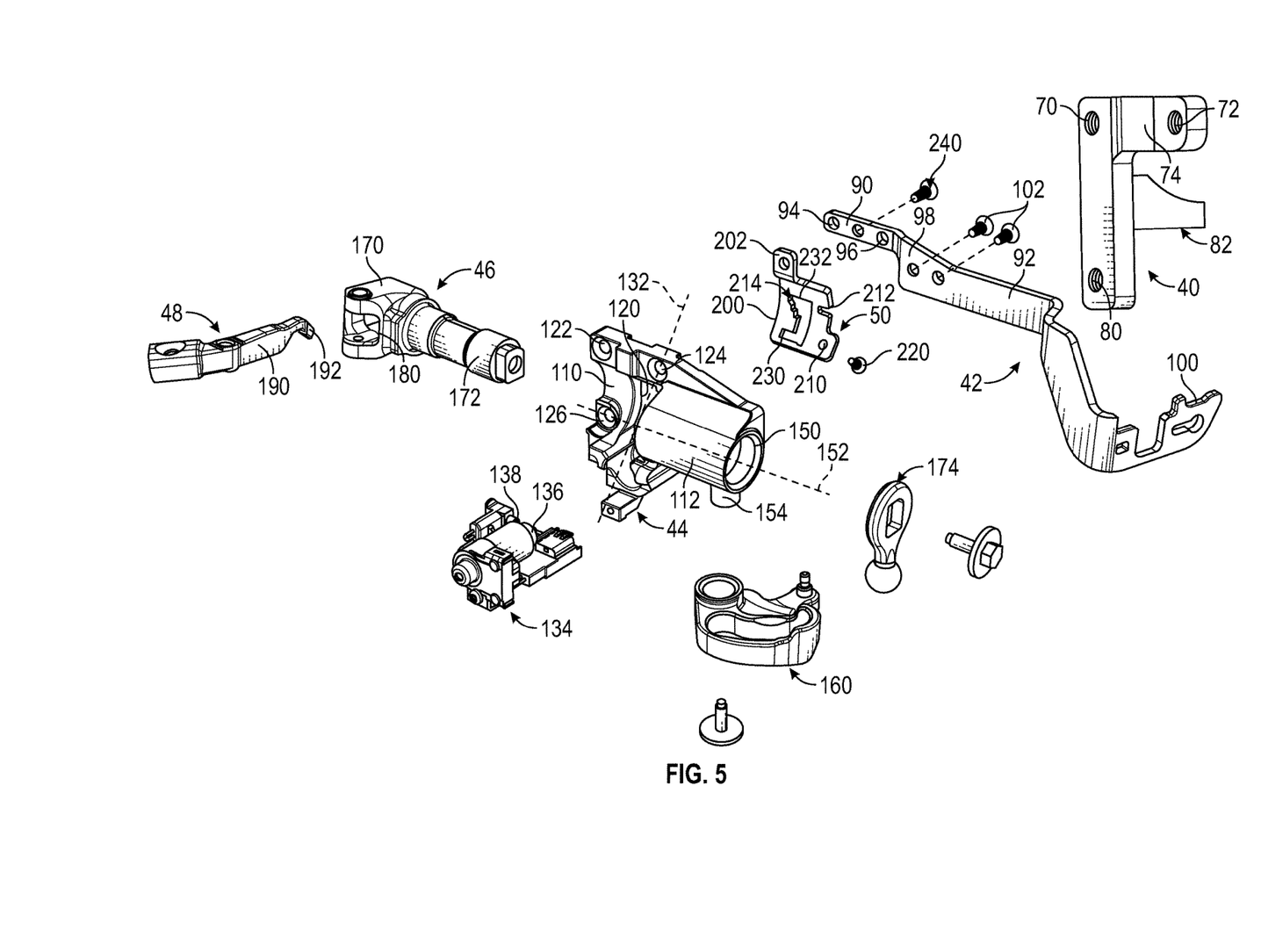
FIG. 5 is a disassembled view of the modular shift assembly of the steering column assembly.

Referring to FIGS. 1, 3, and 5, the first shaft portion 170 defines a first shaft opening 180 and a second shaft opening 182. The first shaft opening 180 extends along the second axis 132. The second shaft opening 182 extends along the third axis 152 such that the second shaft opening 182 is disposed substantially transverse to the first shaft opening 180.

The second shaft portion 172 extends from the first shaft portion 170 along the third axis 152. The second shaft portion 172 is at least partially received within the shift bracket second opening 150 along the third axis 152. An actuator 174 is disposed about an end of the second shaft portion 172. The actuator 174 extends into and is at least partially received by the cam assembly 160.

The shift clevis 48 is at least partially received within and is pivotally connected to the shaft 46. The shift clevis 48 extends at least partially through the first shaft opening 180 and the shift bracket first opening 120 towards the jacket assembly 20. In at least one embodiment, the shift clevis 48 extends at least partially through the second shaft opening 182 and the shift bracket first opening 120.

The shift clevis 48 includes an arm 190 and a tip 192. The arm 190 extends along the second axis 132 through the shift bracket first opening 120. The tip 192 extends from a distal end of the arm 190 and extends into or at least partially through the shift gate assembly 50. The tip 192 is angled relative to the arm 190 and the second axis 132. The tip 192 is angled away from the second axis 132. In at least one embodiment, the tip 192 is angled towards the BTSI 134 and/or the BTSI centerline.

The shift gate assembly 50 is at least partially disposed between and is operatively connected to the cable bracket 42 and the shift bracket 44. The shift gate assembly 50 includes a detent plate 200 and a tab 202.

The detent plate 200 is operatively connected to the first shift bracket portion 110. The detent plate 200 is disposed opposite the shaft 46. The detent plate 200 has a curvature such that a portion of the detent plate 200 is disposed closer to the jacket assembly 20 than the tab 202. The detent plate 200 may have a concave configuration.

The detent plate 200 defines a detent mounting hole 210, a notch 212, and a plurality of detents 214. The detent mounting hole 210 is arranged to receive a fourth fastener 220 couple the detent plate 200 to the first shift bracket portion 110. The notch 212 is disposed between the detent mounting hole 210 and the tab 202. The notch 212 is arranged to receive a protrusion 222 that extends from the first shift bracket portion 110 to locate the shift gate assembly 50 relative to the shift clevis 48.

Figure 4:
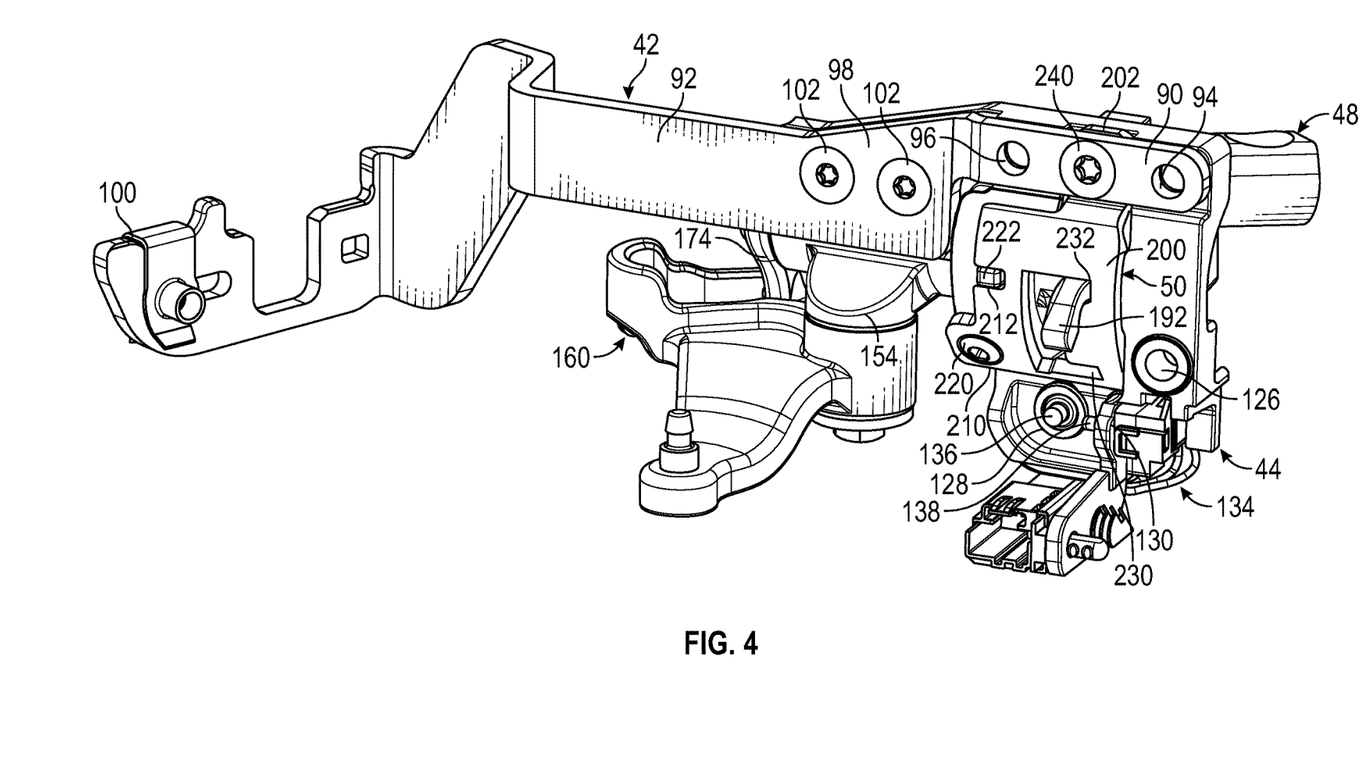

The plurality of detents 214 are arranged to receive the tip 192 of the shift clevis 48. The plurality of detents 214 correspond to transmission positions such as a park position, P, and a non-park position, including a reverse position, R, a neutral position, N, a drive position, D, and another drive position, M. The park position, P, may correspond to a first detent 230 (as shown in FIGS. 6A-6E) and a non-park position may correspond to a second detent 232 (as shown in FIG. 4).

The tip 192 of the shift clevis 48 extends through the first detent 230 while the shift clevis 48 is in the park position. The tip 192 of the shift clevis 48 extends through the second detent 232 while the shift clevis 48 is in a non-park position.

The tab 202 extends from the detent plate 200. The tab 202 is disposed between the first cable bracket portion 90 and the first shift bracket portion 110. The tab 202 is operatively connected to the first cable bracket portion 90 and the first shift bracket portion 110 by a clamping screw 240 that extends through the first cable bracket portion 90 and the tab 202 and extends into the first shift bracket portion 110.

Figure 6A:
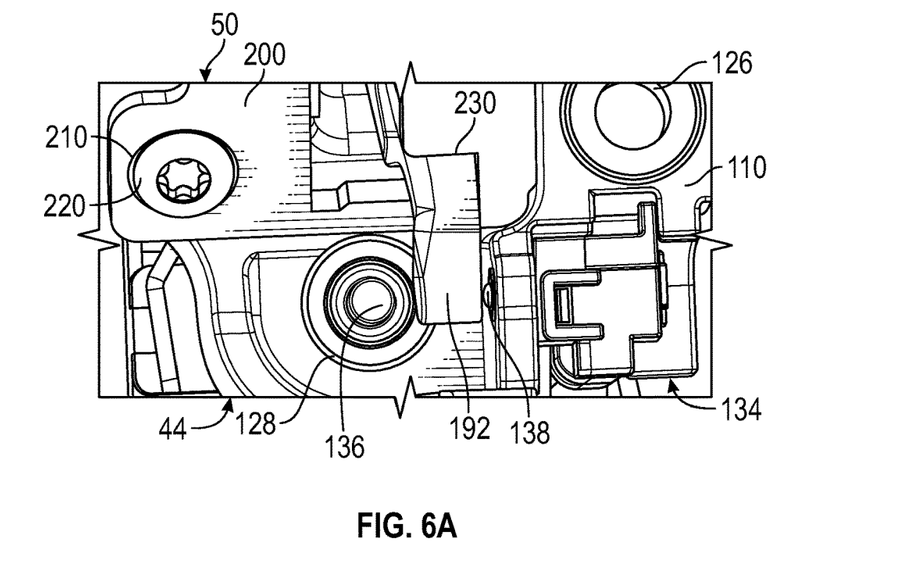
FIGS. 6A-6E are various views of the modular shift assembly while in a park position.
Figure 6B:
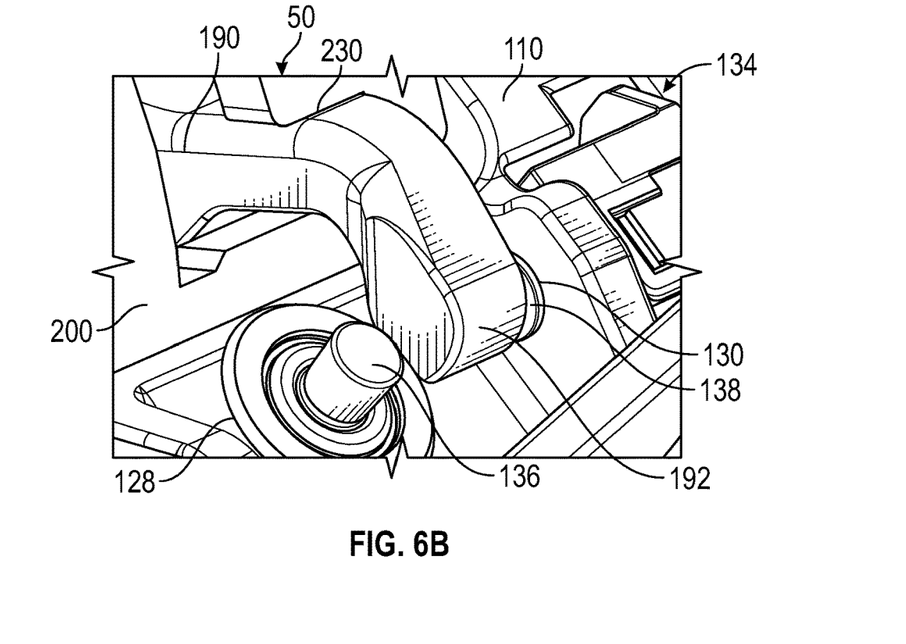

Referring to FIGS. 6A-6E, the process of moving the shift clevis 48 away from the park position, e.g. the first detent 230, is illustrated. As shown in FIG. 6A, while the transmission is in park, the tip 192 of the shift clevis 48 is received within the first detent 230, the pin 136 is in the extended position, and the tip 192 of the shift clevis 48 engages the switch 138. As shown in FIG. 6B, a portion of the tip 192 of the shift clevis 48 is proximately aligned with second mounting opening 130.

Figure 6C:
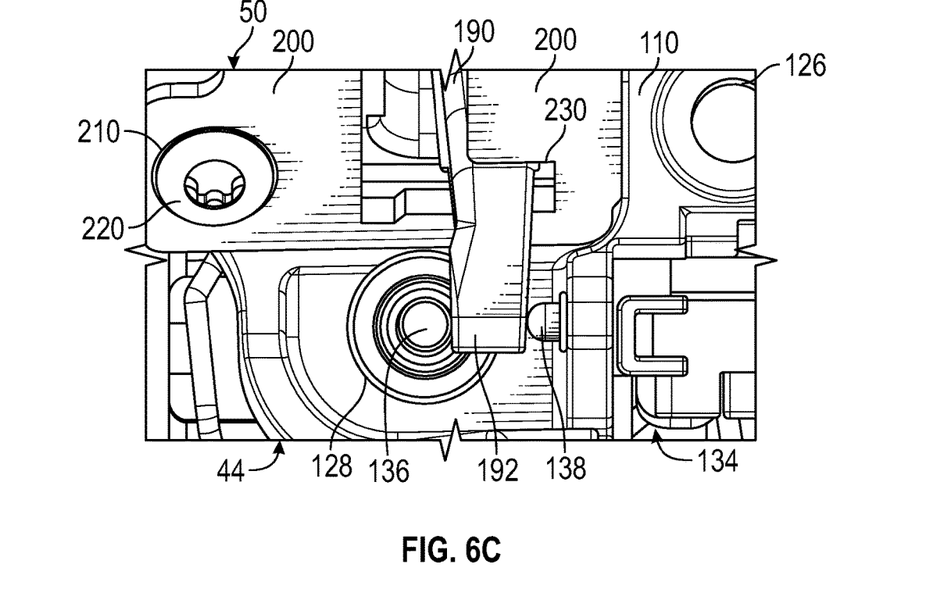

As shown in FIG. 6C, in response to an attempt to move the shift clevis 48 from the park position, the tip 192 of the shift clevis 48 contacts the pin 136 to inhibit movement away from the first detent 230.

Figure 6D:
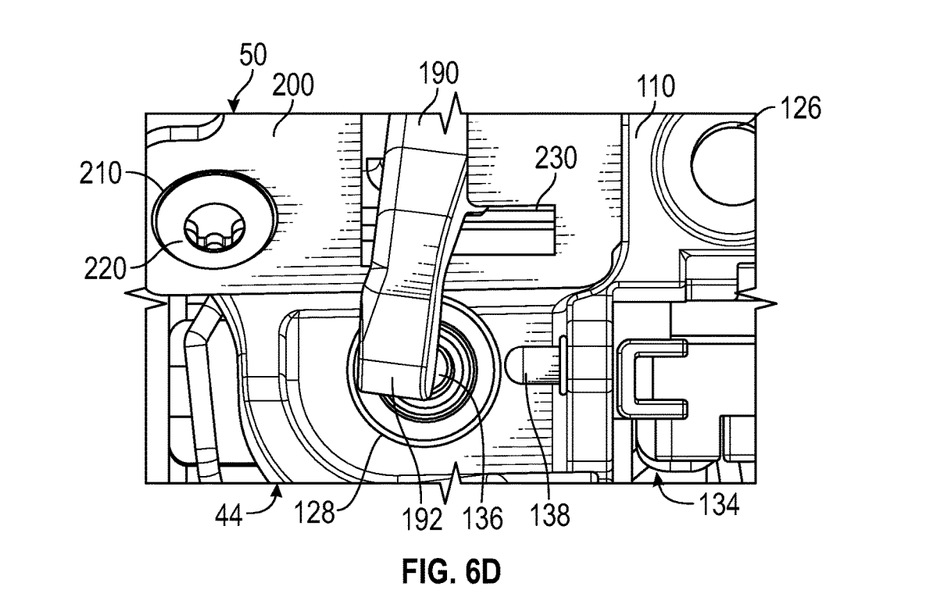
Figure 6E:
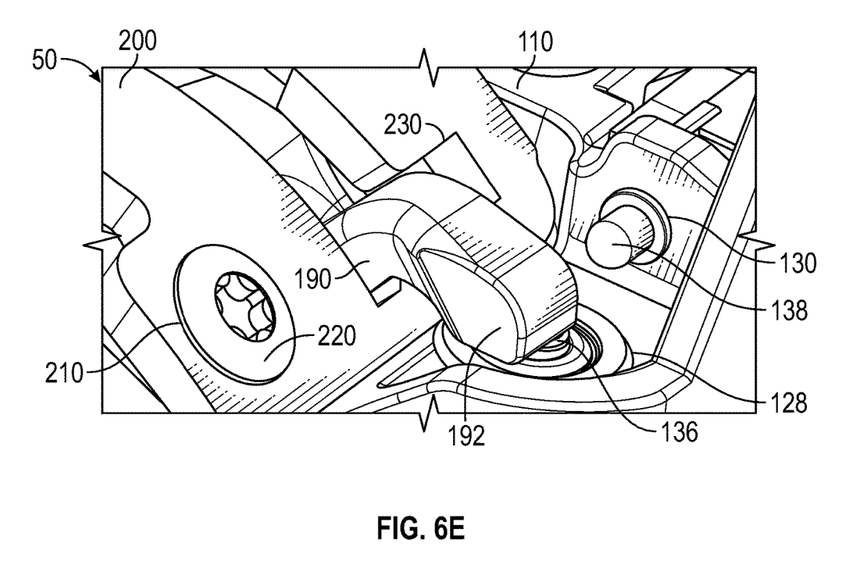

As shown in FIGS. 6D and 6E, in response to the depression of a brake pedal or activation of a brake system, the pin 136 retracts enabling the tip 192 of the shift clevis 48 to be moved away from the first detent 230 and is enabled to be moved towards or into park select.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A steering column assembly, comprising:
   a jacket assembly that extends along a first axis; and
   a modular shift assembly operatively connected to the jacket assembly, comprising:
   a shift bracket having a first shift bracket portion defining a shift bracket first opening that extends along a second axis and a second shift bracket portion extending from the first shift bracket portion, the second shift bracket portion defining a shift bracket second opening that extends along a third axis,
   a shaft having a first shaft portion defining a first shaft opening that extends along the second axis and a second shaft portion extending from the first shaft portion, the second shaft portion is at least partially received within the shift bracket second opening, and
a shift clevis extending at least partially through the first shaft opening and the shift bracket first opening towards the jacket assembly.

2. The steering column assembly of claim 1, wherein the shift clevis includes an arm that extends along the second axis and a tip that extends from the arm.

3. The steering column assembly of claim 2, wherein the tip is angled away from the second axis.

4. The steering column assembly of claim 2, wherein the modular shift assembly further comprises:
a cable bracket having a first cable bracket portion that is operatively connected to the first shift bracket portion and a second cable bracket portion extending from the first shift bracket portion.

5. The steering column assembly of claim 4, wherein the first cable bracket portion is disposed parallel to but not coplanar with the second cable bracket portion.

6. The steering column assembly of claim 4, wherein the modular shift assembly further comprises:
a shift gate assembly that is at least partially disposed between first shift bracket portion and the first cable bracket portion.

7. The steering column assembly of claim 6, wherein the shift gate assembly is provided with a plurality of detents arranged to receive the tip.

8. A steering column assembly, comprising:
a jacket assembly that extends along a first axis; and
a modular shift assembly, comprising:
a mounting bracket disposed on the jacket assembly,
a cable bracket having a first cable bracket portion that is operatively connected to the mounting bracket and a second cable bracket portion extending from the first cable bracket portion,
a shift bracket having a first shift bracket portion that is operatively connected to the first cable bracket portion and a second shift bracket portion extending from the first shift bracket portion, and
a shift gate assembly that is at least partially disposed between and operatively connected to the first cable bracket portion and the first shift bracket portion.

9. The steering column assembly of claim 8, wherein the mounting bracket includes a first mounting bracket portion disposed parallel to the first axis and a second mounting bracket portion extending from the first mounting bracket portion and disposed transverse to the first axis.

10. The steering column assembly of claim 9, wherein the second mounting bracket portion is operatively connected to the first shift bracket portion.

11. The steering column assembly of claim 9, wherein the shift gate assembly includes a detent plate and a tab extending from the detent plate.

12. The steering column assembly of claim 11, wherein a first fastener and a second fastener extend at least partially through the first shift bracket portion, the first cable bracket portion, and the first mounting bracket portion.

13. The steering column assembly of claim 12, wherein the tab is disposed between the first fastener and the second fastener.

14. The steering column assembly of claim 12, wherein a clamping screw extends at least partially through the detent plate and the first shift bracket portion.

15. The steering column assembly of claim 14, wherein the detent plate defines a detent that is proximately aligned with the clamping screw.

16. The steering column assembly of claim 14, wherein the first shift bracket portion defines a first mounting opening and a second mounting opening that is spaced apart from the first mounting opening.

17. The steering column assembly of claim 16, wherein the first mounting opening extends along an axis that is disposed transverse to the first axis and the second mounting opening extends along another axis that is disposed parallel to the first axis.

18. A modular shift assembly for a steering column assembly, comprising:
a cable bracket operatively connected to a jacket assembly;
a shift bracket having a first shift bracket portion operatively connected to the cable bracket and defining a shift bracket first opening and a second shift bracket portion defining a shift bracket second opening;
a shaft having a first shaft portion defining a first shaft opening and a second shaft portion that is at least partially received within the shift bracket second opening; and
a shift gate assembly disposed between the shift bracket and the cable bracket having
a detent plate that is operatively connected to the first shift bracket portion, and
a tab extending from the detent plate that is operatively connected to the first shift bracket portion and the cable bracket.

19. The modular shift assembly of claim 18, further comprising:
a shift clevis having an arm that extends through the shift bracket first opening and a tip that is angled relative to the arm and extends through a detent defined by the detent plate.

20. The modular shift assembly of claim 18, wherein the detent plate has a curvature such that a portion of the detent plate is disposed closer to the jacket assembly than the tab.

* * * * *